United States Patent
Zhang et al.

(10) Patent No.: US 11,277,240 B2
(45) Date of Patent: Mar. 15, 2022

(54) ENHANCED SOUNDING REFERENCE SIGNAL TRANSMISSION

(71) Applicant: NOKIA TECHNOLOGIES OY, Espoo (FI)

(72) Inventors: Yi Zhang, Beijing (CN); Yuantao Zhang, Beijing (CN); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 58 days.

(21) Appl. No.: 16/636,995

(22) PCT Filed: Aug. 11, 2017

(86) PCT No.: PCT/CN2017/097106
§ 371 (c)(1),
(2) Date: Feb. 6, 2020

(87) PCT Pub. No.: WO2019/028836
PCT Pub. Date: Feb. 14, 2019

(65) Prior Publication Data
US 2020/0204316 A1 Jun. 25, 2020

(51) Int. Cl.
*H04W 72/04* (2009.01)
*H04L 5/00* (2006.01)
*H04B 1/713* (2011.01)

(52) U.S. Cl.
CPC .......... *H04L 5/0048* (2013.01); *H04B 1/713* (2013.01); *H04L 5/0007* (2013.01); *H04W 72/042* (2013.01)

(58) Field of Classification Search
CPC .......... H04W 72/042; H04W 72/0446; H04W 72/0413; H04W 76/14; H04W 16/14;
(Continued)

(56) References Cited

U.S. PATENT DOCUMENTS 8,320,267 B2* 11/2012 Wei ................... H04L 5/0044
370/252
2011/0098054 A1* 4/2011 Gorokhov ........... H04L 5/0035
455/452.1
(Continued)

FOREIGN PATENT DOCUMENTS

EP          3 154 214 A1    4/2017
GN          103138817 A     6/2013
WO     WO 2017/076162 A1    5/2017

OTHER PUBLICATIONS

Extended European Search Report dated Feb. 24, 2021 corresponding to European Patent Application No. 17921248.5.
(Continued)

*Primary Examiner* — Eva Y Puente
(74) *Attorney, Agent, or Firm* — Squire Patton Boggs (US) LLP

(57) ABSTRACT

Various communication systems may benefit from an improved transmission of a sounding reference signal. For example, certain communication systems may benefit from an enhanced sounding reference signal transmission via antenna switching or repetition. A method, in certain embodiments, may include receiving a signaling indication at a user equipment from a network entity. The signaling indication may indicate a configuration for sounding reference signal transmission via at least one of antenna switching or repetition using a resource group. The resource group may comprise a plurality of resources that are either adjacent or have a limited time interval between at least two of the plurality of resources within the resource group. The method may also include transmitting the sounding reference signal from the user equipment to the network entity via at least one of the antenna switching or the repetition using the resource group.

20 Claims, 9 Drawing Sheets

(58) Field of Classification Search
CPC ......... H04W 72/0406; H04W 72/1289; H04W
4/70; H04W 72/04; H04W 72/0453;
H04W 72/14; H04W 76/27; H04L
5/0048; H04L 5/0053; H04L 5/0023;
H04L 5/0051; H04L 5/0007; H04L
5/0094; H04L 5/001; H04L 5/0044; H04L
5/0091; H04L 5/0092; H04L 25/0226;
H04L 5/005; H04L 5/0055; H04B 7/0617;
H04B 7/0695; H04B 7/0456; H04B
17/318; H04B 7/0486; H04B 7/0626;
H04B 7/0482; H04B 7/088; H04B
17/382; H04B 7/0404; H04B 7/0413;
H04B 7/0452
USPC ........................................................ 375/260
See application file for complete search history.

(56) References Cited

U.S. PATENT DOCUMENTS

| 2011/0243262 | A1* | 10/2011 | Ratasuk | ................ | H04L 27/261 |
| | | | | | 375/260 |
| 2012/0178502 | A1* | 7/2012 | Teo | ........................ | H04B 7/061 |
| | | | | | 455/562.1 |
| 2013/0051356 | A1* | 2/2013 | Hong | .................. | H04L 27/2602 |
| | | | | | 370/329 |
| 2021/0083824 | A1* | 3/2021 | Wernersson | .......... | H04L 5/0051 |

OTHER PUBLICATIONS

Qualcomm Incorporated: "Discussion on SRS Design," 3GPP Draft; R1-1711174, 3GPP TSG RAN WG1 NR Ad-Hoc#2, Qingdao, China, Jun. 26, 2017, XP051300374.

International Search Report and Written Opinion dated May 4, 2018 corresponding to International Patent Application No. PCT/CN2017/097106.

Qualcomm Inc. "SRS capacity enhancements," R1-155737, 3GPP TSG-RAN WG1 #82bis, Oct. 9, 2015.

Huawei et al. "UL SRS design for beam management, CSI acquisition," R1-1706938, 3GPP TSG RAN WGl Meeting #89, May 19, 2017.

LG Electronics "On SRS design and related operations," R1-1710298, 3GPP TSG RAN WG1 NR Ad-Hoc#2, Jun. 30, 2017.

* cited by examiner

Figure 7A

| Value of SRS request field | Description |
|---|---|
| '00' | No type 1 SRS trigger |
| '01' | The 1st SRS parameter set for SRS resource group set 1 configured by higher layers |
| '10' | The 2nd SRS parameter set for SRS resource group set 2 configured by higher layers |
| '11' | The 3rd SRS parameter set for SRS resource group set 3 configured by higher layers |

Figure 7B

| Value of SRS request field | Description |
|---|---|
| '00' | No type 1 SRS trigger |
| '01' | The 1st SRS parameter set for SRS resource group set 1 configured by higher layers |

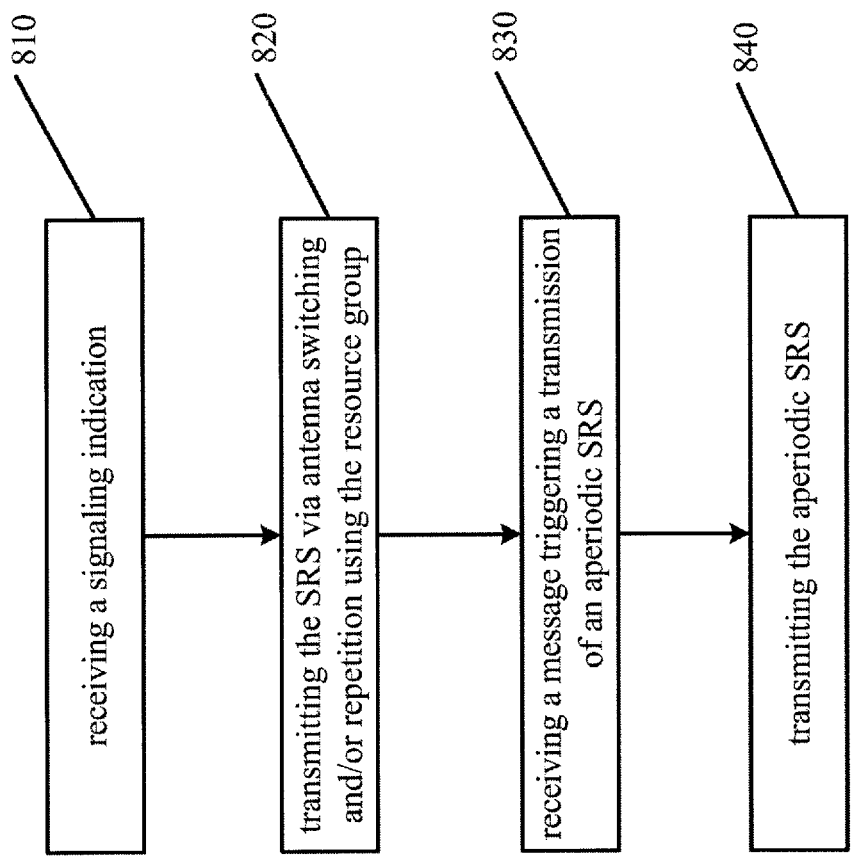

ENHANCED SOUNDING REFERENCE SIGNAL TRANSMISSION

BACKGROUND

Field

Various communication systems may benefit from an improved transmission of a sounding reference signal. For example, certain communication systems may benefit from an enhanced sounding reference signal transmission via antenna switching or repetition.

Description of the Related Art

Third Generation Partnership Project (3GPP) Fifth Generation (5G) or New Radio (NR) technology are characterized by multiple antenna transmissions with a different number of transmitters and receivers at a user equipment. When a system includes uplink/downlink channel reciprocity, a NR Node B (gNB) may obtain a downlink channel state information (CSI), also referred to as channel quality information, based on the measurement of a sounding reference signal (SRS) transmitted to the gNB from the user equipment. When the user equipment has different downlink and uplink capabilities, however, for example, the user equipment includes two transmitters and four receivers, the user equipment can only transmit SRS on two antennas as a time. This means that the gNB can only obtain part of the downlink CSI based on the measurement of the SRS.

In order to obtain fill downlink CSI, antenna switching may be utilized. Using antenna switching, the user equipment may transmit a four antenna port SRS in two different transmission times using a two antenna port SRS for each transmission time. In 5G or NR technology, eight layers are supported for a single user multiple input multiple output (SU MIMO). Therefore, if only a four antenna port SRS is supported at the user equipment, antenna switching is required for obtaining the full CSI for eight receivers in 5G or NR technology.

SUMMARY

According to certain embodiments, an apparatus may include at least one memory including computer program code, and at least one processor. The at least one memory and the computer program code may be configured, with the at least one processor, to cause the apparatus at least to receive a signaling indication at a user equipment from a network entity. The signaling indication may indicate a configuration for sounding reference signal transmission via at least one of antenna switching or repetition using a resource group. The resource group may comprise a plurality of resources that are either adjacent or have a limited time interval between at least two of the plurality of resources within the resource group. The at least one memory and the computer program code may also be configured, with the at least one processor, to cause the apparatus at least to transmit the sounding reference signal from the user equipment to the network entity via at least one of the antenna switching or the repetition using the resource group.

A method, in certain embodiments, may include receiving a signaling indication at a user equipment from a network entity. The signaling indication may indicate a configuration for sounding reference signal transmission via at least one of antenna switching or repetition using a resource group. The resource group may comprise a plurality of resources that are either adjacent or have a limited time interval between at least two of the plurality of resources within the resource group. The method may also include transmitting the sounding reference signal from the user equipment to the network entity via at least one of the antenna switching or the repetition using the resource group.

An apparatus, in certain embodiments, may include means for receiving a signaling indication at a user equipment from a network entity. The signaling indication may indicate a configuration for sounding reference signal transmission via at least one of antenna switching or repetition using a resource group. The resource group may comprise a plurality of resources that are either adjacent or have a limited time interval between at least two of the plurality of resources within the resource group. The apparatus may also include means for transmitting the sounding reference signal from the user equipment to the network entity via at least one of the antenna switching or the repetition using the resource group.

According to certain embodiments, a non-transitory computer-readable medium encoding instructions that, when executed in hardware, perform a process. The process may include receiving a signaling indication at a user equipment from a network entity. The signaling indication may indicate a configuration for sounding reference signal transmission via at least one of antenna switching or repetition using a resource group. The resource group may comprise a plurality of resources that are either adjacent or have a limited time interval between at least two of the plurality of resources within the resource group. The process may also include transmitting the sounding reference signal from the user equipment to the network entity via at least one of the antenna switching or the repetition using the resource group.

According to certain other embodiments, a computer program product may encode instructions for performing a process. The process may include receiving a signaling indication at a user equipment from a network entity. The signaling indication may indicate a configuration for sounding reference signal transmission via at least one of antenna switching or repetition using a resource group. The resource group may comprise a plurality of resources that are either adjacent or have a limited time interval between at least two of the plurality of resources within the resource group. The process may also include transmitting the sounding reference signal from the user equipment to the network entity via at least one of the antenna switching or the repetition using the resource group.

According to certain embodiments, an apparatus may include at least one memory including computer program code, and at least one processor. The at least one memory and the computer program code may be configured, with the at least one processor, to cause the apparatus at least to transmit a signaling indication from a network entity to a user equipment. The signaling indication may indicate transmitting a configuration for sounding reference signal via at least one of antenna switching or repetition using a resource group. The resource group may comprise a plurality of resources that are either adjacent or have a limited time interval between at least two of the plurality of resources within the resource group. The at least one memory and the computer program code may also be configured, with the at least one processor, to cause the apparatus at least to receive the sounding reference signal from the user equipment at the network entity via at least one of the antenna switching or the repetition using the resource group.

A method, in certain embodiments, may include transmitting a signaling indication from a network entity to a user equipment. The signaling indication may indicate transmitting a configuration for sounding reference signal via at least one of antenna switching or repetition using a resource group.

The resource group may comprise a plurality of resources that are either adjacent or have a limited time interval between at least two of the plurality of resources within the resource group. The method may also include receiving the sounding reference signal from the user equipment at the network entity via at least one of the antenna switching or the repetition using the resource group.

An apparatus, in certain embodiments, may include means for transmitting a signaling indication from a network entity to a user equipment. The signaling indication may indicate transmitting a configuration for sounding reference signal via at least one of antenna switching or repetition using a resource group. The resource group may include a plurality of resources that are either adjacent or have a limited time interval between at least two of the plurality of resources within the resource group. The apparatus may also include means for receiving the sounding reference signal from the user equipment at the network entity via at least one of the antenna switching or the repetition using the resource group.

According to certain embodiments, a non-transitory computer-readable medium encoding instructions that, when executed in hardware, perform a process. The process may include transmitting a signaling indication from a network entity to a user equipment. The signaling indication may indicate transmitting a configuration for sounding reference signal via at least one of antenna switching or repetition using a resource group. The resource group may include a plurality of resources that are either adjacent or have a limited time interval between at least two of the plurality of resources within the resource group. The process may also comprise receiving the sounding reference signal from the user equipment at the network entity via at least one of the antenna switching or the repetition using the resource group.

According to certain other embodiments, a computer program product may encode instructions for performing a process. The process may include transmitting a signaling indication from a network entity to a user equipment. The signaling indication may indicate transmitting a configuration for sounding reference signal via at least one of antenna switching or repetition using a resource group. The resource group may include a plurality of resources that are either adjacent or have a limited time interval between at least two of the plurality of resources within the resource group. The process may also comprise receiving the sounding reference signal from the user equipment at the network entity via at least one of the antenna switching or the repetition using the resource group.

BRIEF DESCRIPTION OF THE DRAWINGS

For proper understanding of the invention, reference should be made to the accompanying drawings, wherein:

FIG. 7A illustrates an example of sounding reference signal value table according to certain embodiments.

FIG. 7B illustrates an example of sounding reference signal value table according to certain embodiments.

FIG. 8 illustrates an example of a flow diagram according to certain embodiments.

DETAILED DESCRIPTION

Certain embodiments may enhance SRS transmissions by supporting flexible antenna switching. For example, the user equipment may transmit an SRS to a network entity, such as a gNB, via at least one of antenna switching or repetition using a resource group. The resource group may include a plurality of resources, such as OFDM symbols or any other transmission time slots. The resource group may be configured by the network entity or constructed based on a signaling indication received by the user equipment from the network entity. The user equipment may also be allowed to transmit periodic or aperiodic SRS for a selected one or more beams or beam pairs. The beam may be characterized by a user equipment Tx/Rx spatial filter assumption. Beam pairs may be characterized by both user equipment and network entity, such as gNB, Tx/Rx spatial filter assumption. According to the Tx/Rx spatial filter assumption, a coefficient may be used, for example, as a multiplier, to transmit the SRS, which may take the effect of beamforming.

Figure 1:
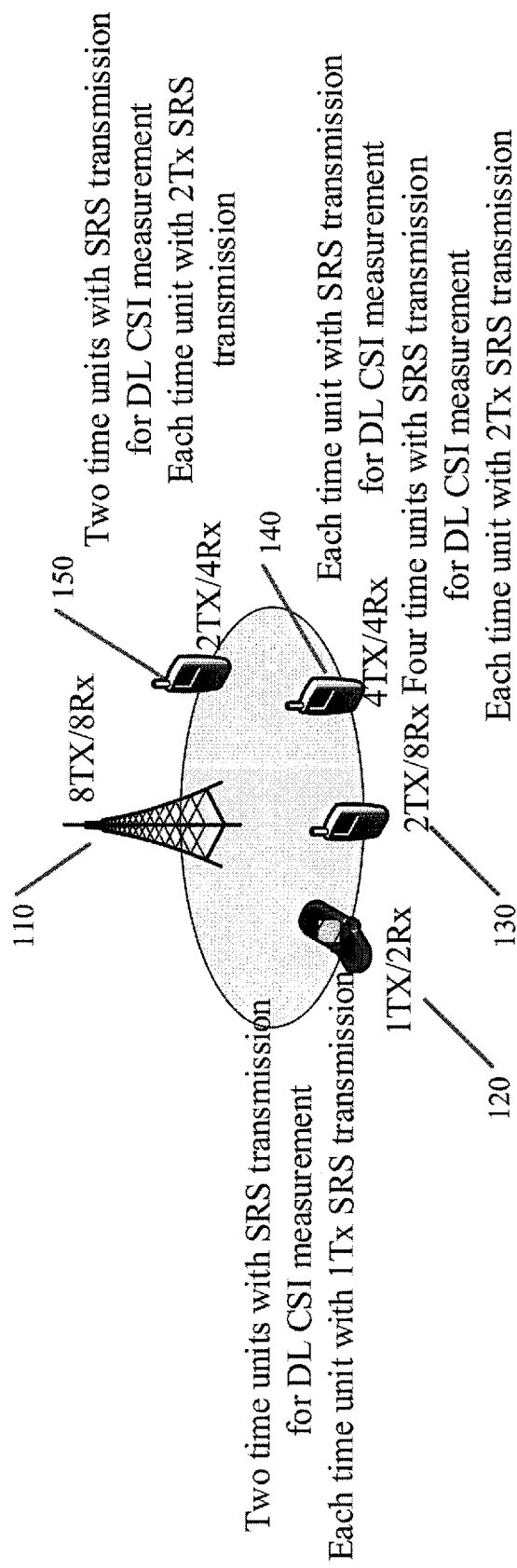
FIG. 1 illustrates an example of a system according to certain embodiments.

FIG. 1 illustrates an example of a system according to certain embodiment. SRS transmissions, in some embodiments, may be transmitted via a flexible antenna switching in diverse scenarios utilizing beamforming and/or repetition. In a 3GPP Long Term Evolution (LTE) system, a two transmitter (Tx) antenna switching is supported. SRS in LTE may be transmitted on one SRS resource with a specified pattern. In 5G NR, on the other hand, at least 2Tx, and often 4Tx antenna switching may be supported. A more flexible transmitter (Tx) or receiver (Rx) number may therefore be used in 5G NR. The downlink CSI is not measured by the network entity, but rather may be obtained by the network entity measuring the SRS.

As shown in FIG. 1, a network node 110, such as a gNB, may include 8Tx and 8Rx, and a first user equipment 120 including 1Tx and 2Rx. First user equipment 120 may be allocated two time units with SRS transmission for the network entity obtaining downlink CSI information based on SRS measurement, and each time unit for a 1Tx SRS transmission. Second user equipment 130 includes 2Tx and 8Rx, and may be allocated four time units with SRS transmission for the network node obtaining downlink CSI information based on SRS measurement, and each time unit with 2Tx SRS transmission. FIG. 1 also illustrates a third user equipment 140 that includes 4Tx and 4Rx, and may be allocated one time unit with a 4Tx SRS transmission for the network node obtaining downlink CSI information based on SRS measurement, and a fourth user equipment 150 that includes 2Tx and 4Rx, and may be allocated two time units with SRS transmission for the network node obtaining downlink CSI information based on SRS measurement, and each time unit with 2Tx SRS transmission.

Figure 2:
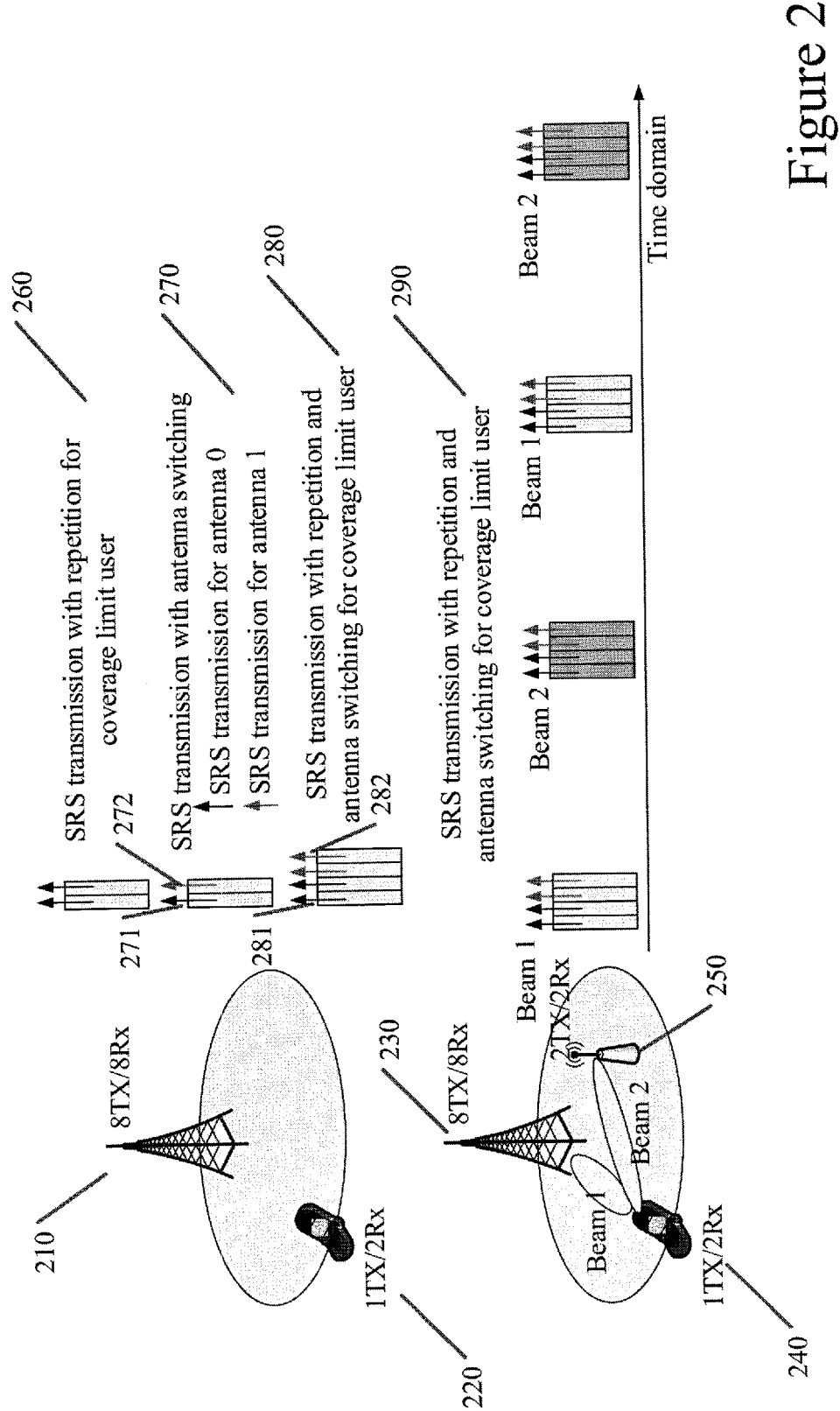
FIG. 2 illustrates an example of a system according to certain embodiments.

FIG. 2 illustrates an example of a system according to certain embodiments. In 5G NR technology, beamforming may be used by both the gNB and the user equipment. After beam management, there may be multiple candidate beams for a proper data transmission. In certain embodiments, therefore, multiple candidate transmit and/or receive beams that may be considered for SRS transmission with antenna switching for obtaining downlink CSI based on reciprocity. Reciprocity may mean that the CSI for both the downlink and the uplink are assumed to be substantially the same, which is widely used in time division duplex (TDD) systems. Thus, the network entity, such as the gNB, may obtain downlink CSI from uplink CSI by measuring SRS. Some embodiments may also utilize SRS transmission with repetition to improve CSI. Repetition and antenna switching share some characteristics, but differ in that repetition uses the same and antenna switching uses different antenna ports in several transmission times, for example repetition or switching period.

As shown in FIG. 2, a first cell is shown including a network node 210, which includes an 8Tx and 8Rx, and a user equipment 220, which includes a 1Tx and 2Rx. Embodiment 260 describes an SRS transmission with repetition for a coverage limited user. The user may be limited to the coverage area of the first cell. Embodiment 270 describes an SRS transmission with antenna switching, in which a first SRS transmission 271 occurs via antenna port 0, while a second SRS transmission 272 occurs via antenna port 1. Antenna switching, therefore, may include transmitting SRS on two different antenna ports during two different times or OFDM symbols. In certain other embodiments 280, a combination of antenna switching and repetition may be used, with the first SRS transmission 281 repeating in the first two OFDM symbols via a first antenna port, while the a second SRS transmission 282 repeating in the last two OFDM symbols via a second antenna port.

FIG. 2 also illustrates a system including a network node 230, which includes 8Tx and 8Rx, a user equipment 240, which includes 1Tx and 2Rx, and a second base station 250, which includes 2Tx and 2Rx. User equipment 240 may transmit the SRS associated with beam 1 to network node 230, while the SRS associated with beam 2 may be transmitted to base station 250. As can be seen in embodiments 290, certain embodiments may use an SRS transmission with both repetition and antenna switching, similar to the pattern shown in embodiment 280, in which transmission is alternating between Beam 1 and Beam 2 on a time domain.

In order to optimize channel estimation quality, a large transmission time interval between different SRS antenna ports for one channel estimation is not desirable. To avoid the large transmission interval, it may be helpful to configure adjacent SRS resources in a time domain for different antenna ports. A similar optimization may be desired for SRS transmissions with repetition. On the other hand, the antenna switching capabilities in some user equipment may be higher on account of short antenna switching time when adjacent SRS resources may be configured for transmission with different antenna ports. Therefore, it may be helpful to provide added flexibility for SRS transmission intervals, in which antenna ports of different hardware capabilities are used, such as a different number of transmitters and/or receivers. Flexibility may be helpful in optimizing SRS transmission via antenna switching between different carriers or in a large frequency space.

As discussed above, obtaining complete downlink CSI at the network entities may include receiving SRS transmission from all antenna ports of one or more user equipment. For example, periodic or aperiodic SRS transmission on multiple time units may be used for different antenna ports. In certain embodiments, CSI for one or multiple beams may be triggered according to gNB specifications. A flexible triggering scheme may also be supported for SRS transmission with full antenna ports being made available for selected beams.

Figure 3:
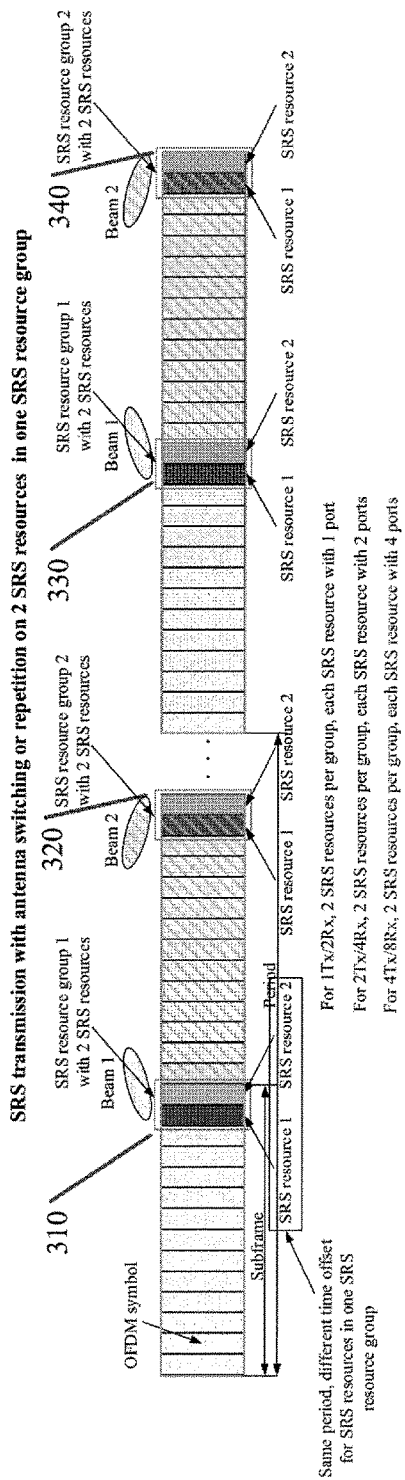
FIG. 3 illustrates an example of sounding reference signal transmission according to certain embodiments.

Certain embodiments may provide for transmitting a SRS from a user equipment to a network entity via at least one of antenna switching or repetition using a resource group. The resource group may include a plurality of SRS resources being adjacent to one another and/or having a limited time interval between the plurality of resources. For example, a plurality of resources within the resource group may be included within a same transmission period and have a different transmission time offset, as shown in FIG. 3. Transmitting the SRS based on the resource group may allow for an accurate downlink CSI based on reciprocity for user equipment with a diverse number of Tx and Rx.

SRS transmission via antenna switching or repetition may be made independently for each SRS resource group, also referred to simply as a resource group. Each SRS resource group may be associated with a specific beam or pair of beams, as shown in FIG. 3. The resource group may also include a plurality of resources that have the same transmission period, but different transmit time offsets. The time offset may be defined using one or more OFDM symbols. Common characteristics of the resource group may, in some embodiments, help to achieve a desired channel estimation quality and meet antenna switching timing requirement by the user equipment.

In certain embodiments, a resource group may include a different time offset, for each of the plurality of resources included within the group for transmitting the SRS. The time offset may have a value no less than the reported value or a reported grade for antenna switching timing. Antenna switching timing may be the time value in which the user equipment transitions from transmitting the SRS in one antenna port to a different antenna port. Candidates for the different time offsets for the SRS transmission may therefore be based on reported timing values for antenna switching.

Independent hopping may be employed for SRS transmission on the plurality of resources in the resource group, in some embodiments. Hopping may allow the SRS on each of the plurality of resources to be transmitted by the user equipment on a different frequency. Some embodiments may include a different starting physical resource block for each of the plurality of resources. The following equation, for example, may represent the starting physical resource block for SRS resources within a resource group: $n_{b,k} = \{n_{RRC} + (k-1) \times \lfloor N_b/K \rfloor\} \bmod N_b \cdot n_{b,k}$ represents the starting physical resource block for the k-th SRS resource, $N_b$ describes a sub-band number for hopping, and K denotes the total SRS resource number in the resource group. Further details regarding hopping are illustrates in FIG. 5.

The plurality of resources in the resource group may include one or more common configuration parameter. For example, the one or more common configuration parameters may include an SRS bandwidth, a frequency hopping bandwidth, a number of antenna port, and/or a period to simplify SRS configuration signaling. In some embodiments, a resource group may be associated with a specific beam. In some other embodiments, the resource group may include a subgroup of resources. Each subgroup, which may include some of the plurality of resource, may be designed for downlink CSI acquisition for one specific beam. For example, the subgroup of the resource group may be associated with a downlink CSI acquisition for a first beam. The subgroup may include at least some of the plurality of resources in a given group, but may not equal or exceed the number of resources in a given group.

Figure 6:
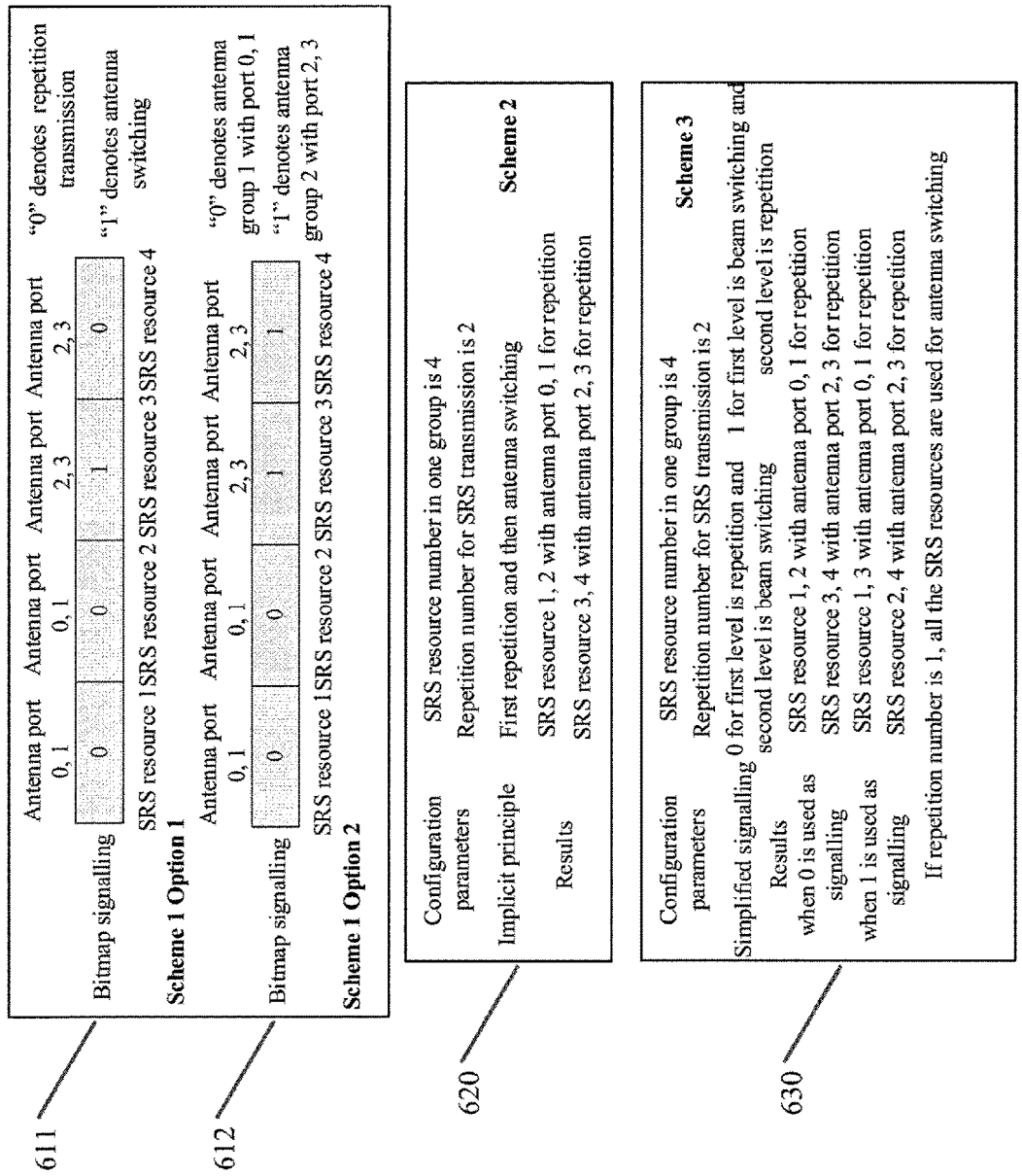
FIG. 6 illustrates an example of sounding reference signal antenna port scheme according to certain embodiments.

In certain embodiments, the network entity may transmit to the user equipment a signaling indication. The signaling indication may indicate or include configuration parameters, guidelines, and/or rules for configuration SRS transmission on the plurality of resources in the resource group via at least one of antenna switching and/or repetition. The transmitting of the signaling indication may include, for example, a bitmap signaling that indicates whether antenna switching is performed for each of the plurality of resources, as shown in FIG. 6. Assuming that the antenna ports are divided into groups in a predetermined manner, such as for example {0,1} and {2,3}, the first option may be a '0' bit and a second option may be a '1' bit. '0' bit may mean that the corresponding SRS resource is meant for repetition, while '1' bit may mean that the corresponding SRS resource is for antenna switching, with respect to the previous SRS resource. In a second option, an antenna group index for each SRS resource may be explicitly indicated as illustrated in FIG. 6. In this second option, the number of antenna port groups may be obtained as a total number of SRS antenna ports divided by the antenna port number in a given resource group.

The signaling indication, on the other hand, may include a simple indication scheme for antenna ports in the plurality of resources in the resource group, as shown in scheme 630 in FIG. 6. '0' may denote a first level as repetition and a second level as antenna or beam switching. '1' may denote a first level as antenna or beam switching and a second level as repetition. The repetition number and SRS resource number on the resource group may be configured by higher layer signaling from a network operator or by the network entity, such as the gNB. When only one of antenna switching or repetition transmission is used, the two level indication may fall back to a one level indication. In other embodiments, the signaling indication may be an implicit principle that utilizes the plurality of resources in the resource group, as shown in scheme 620 in FIG. 6. For example, a first level resource may designate a repetition, while a second level resource may designate antenna switching.

In certain embodiments, the user equipment may receive a message from the network entity, such as a gNB, triggering the transmission of aperiodic SRS based on the resource group. The user equipment may then transmit the aperiodic SRS in response to the message via the at least one antenna switching or the repetition. As discussed above, the resource group may be associated with at least one beam or a pair of beams. For example, FIGS. 7a and 7b illustrate that the network entity may use a 1 or 2 bit triggering signal to trigger the transmission of the aperiodic SRS.

Some embodiments may include an SRS parameter set used for the dynamic triggering of the aperiodic SRS. The parameter set may include a plurality of resources associated with multiple candidate beams or beam pairs. The parameter set, in other embodiments, for dynamic triggering of the aperiodic SRS may include parameter sets for multiple SRS transmission configuration for the plurality of resource in the resource group, such as different time offset and/or starting physical resource block for hopping.

FIG. 3 illustrates an example of a sounding reference signal according to certain embodiments. In particular, FIG. 3 illustrates an SRS transmission via antenna switching or repetition using a resource group. The resource group may be associated with at least one beam or a pair of beams. According to current conclusions from 3GPP RAN1 NR Ad-Hoc #2 meeting, one SRS resource group can be used for a single purpose, such as downlink CSI acquisition. In the embodiment shown in FIG. 3, on the other hand, a resource group may be used for SRS transmission via antenna switching and/or repetition. The conclusions of 3GPP RAN1 NR Ad-Hoc #2 meeting are hereby incorporated by reference in their entirety. In such embodiments, a plurality of resources in different transmission time units may be aggregated as a SRS resource group. With use of the resource group, antenna switching with diverse antenna configuration for different user equipment can be supported. In some embodiments, transmission of the SRS may occur using switched antenna ports on different resources within the resource group in different transmission time units. For example, antenna switching for the following antenna configurations may be at least supported: 1Tx/2Rx, 2Tx/2Rx, 2Tx/4Rx, 2Tx/8Rx, 4Tx/4Rx, 4Tx/8Rx. A resource group including 2, 1, 2, 4, 1, and 2 resources may respectively support the above listed antenna configurations.

To support obtaining CSI for multiple beams, the SRS transmission using a resource group may be associated with one beam or a beam pair. Independent configuration may be made for SRS transmission on different resource groups. FIG. 3 illustrates two resource groups each associated with a pair of beams. As shown in FIG. 3 a first resource group 310 includes two resources associated with beam 1. The first resource group may be located in the last two OFDM symbols of a subframe, which may include 14 OFDM symbols. Each SRS resource may have its own individual resource. The first and second resources in first resource group 310 may be located within the same subframe or time period, but located in a different time offset, meaning in a different OFDM symbol or subframe.

Resource group 320, on the other hand, is associated with a second beam, but also includes two resources. In the embodiment shown in FIG. 3, resource groups 310 and 320 may be configured to have the same periodicity. In the embodiment shown in FIG. 3, resource groups 330 and 340 may be the periodic repetition of resource groups 310 and 320, respectively.

For each resource group, two resources may be used for SRS transmission with one antenna switch or one repetition, where one or more antenna ports can be configured for each resource according to the hardware condition, for example, according to the Tx chain number of the user equipment. For a user equipment with 1Tx/2Tx and 2 resources in the resource group, each resource may transmit the SRS using 1 antenna port. In another example, for a user equipment with 2Tx/4Rx and 2 resources in the resource group, each resource may transmit the SRS using 2 antenna ports. In yet another example, for a user equipment with 4Tx/8Rx and 2 resources in the resource group, each resource may transmit the SRS using 4 antenna ports.

One or more configuration parameters, in certain embodiments, may be shared or may be the same for each resource within the resource group. The parameters may be the shared even when the resources within the resource group are used to transmit the SRS via different antenna ports. For example, configuration parameters may include a transmission Comb, which may inform the user equipment whether to transmit the SRS in every even or odd resource assigned for SRS transmission. Some other configuration parameters may include an SRS bandwidth, frequency hopping bandwidth, number of antenna ports, and/or a time period.

Figure 4:
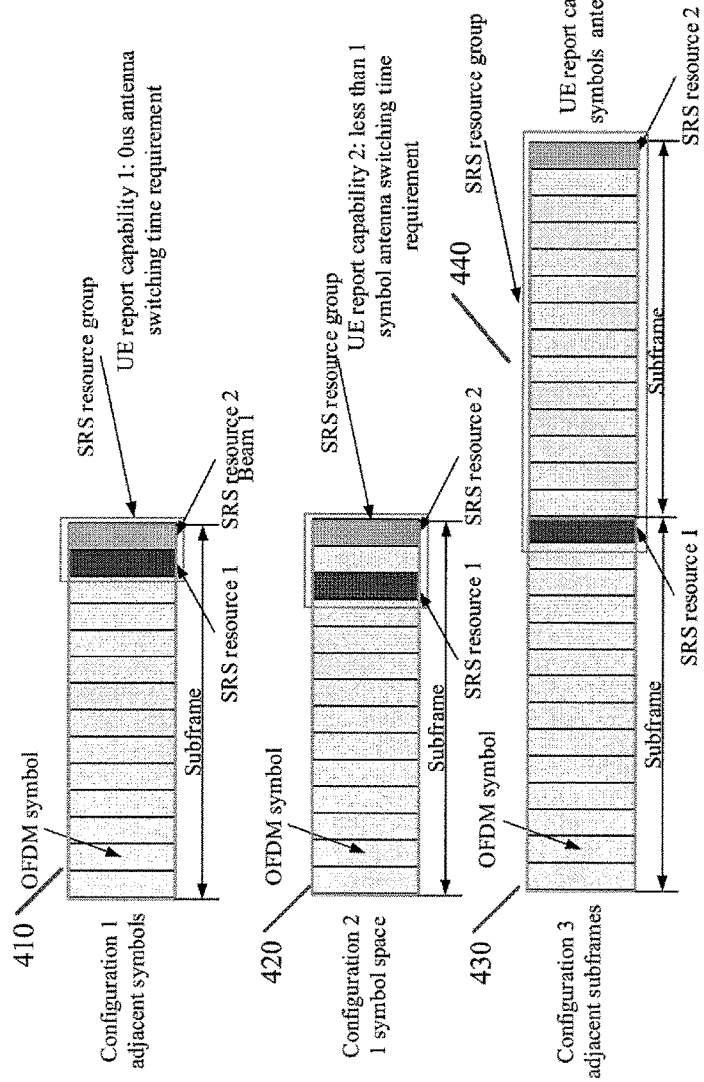
FIG. 4 illustrates an example of sounding reference signal transmission according to certain embodiments.

The resources within the resource group may be either adjacent or have a limited time interval between at least two of the plurality of resources within the resource group, as shown in FIG. 4. The limited time interval may be a time offset, for example a length defined by a number of OFDM symbols, and may be different for different resources. To guarantee the channel estimation quality, the offset value should be kept as small as possible. The smallest value of the offset may be restricted by the hardware capabilities of the user equipment, meaning the antenna switching time requirement of the user equipment. The user equipment, in certain embodiments, may therefore report its hardware capabilities to the network entity. The switching time may be a measurement of time that the user equipment may need before being able to transmit on a second antenna after transmitting on a first antenna. The switching time, for example, may be 0 microsecond (μs), 50 μs, 100 μs, 200 μs, and/or 500 μs. Alternatively, the switching time may be represented by OFDM symbols. For example, 0, 0.5, 1.5, 2.0, 2.5, 3.0, 3.5, 4.0, 4.5, and/or 5.0 OFDM symbols.

FIG. 4 illustrates an example of a sounding reference signal transmission according to certain embodiments. In particular, FIG. 4 illustrates that the network entity, such as a gNB, may receive a report from the user equipment indicating the smallest switching time capabilities of the user equipment. In the embodiment shown in subframe 410, the user equipment may report a capability 1, meaning that the smallest antenna switching timing of which the user equipment capable is 0 μs. 0 μs may mean that the first resource in the resource group and the second resource in the resource group are adjacent to one another.

In subframe 420, the user equipment may report to the network entity that the smallest antenna switching timing capability is less than 1 OFDM symbol. Subframe 420 may have a limited time interval or a time offset of 1 OFDM symbol between the first resource and the second resource in the resource group. The user equipment may also report a third capability to the network entity, which may indicate that the smallest antenna switching timing of which the user equipment capable is 13 OFDM symbols. Since each subframe only includes 14 OFDM symbols in this example, the first resource of the resource group may be included in subframe 430, while the second resource of the resource group may be included in subframe 440. In summary, in the examples shown in FIG. 4, the limited time interval or time space for SRS resource in one group may have three different grades, adjacent, 1 OFDM symbol, or 13 OFDM symbols, which can be decided according to the reported user equipment capabilities for switching time.

For certain embodiments involving SRS transmission via repetition, there may not be any antenna switching for SRS transmissions. As such, the first and second resources of the resource group may be adjacent, and an antenna switching value may not even be reported for SRS transmissions. For SRS transmission that are transmitted via repetition, the gNB may choose SRS resources with adjacent SRS transmission time units or adjacent resources within the resource group.

The OFDM symbol may be assumed, in certain embodiments, as the minimum transmission time unit for SRS transmission. In certain other embodiments, however, sub-OFDM symbols, which may for example be as small as ½ and/or ¼ of a whole OFDM symbol, may be used for SRS transmissions involving enhanced technology. Enhanced technology, for example, may utilize different numerology and/or Interleaved Frequency Division Multiple Access (IF-DMA). The limited time interval between at least two of the plurality of resources within the resource group, such as the time offset between SRS resources in a resource group, may be defined based on sub-OFDM time unit or symbols, in some embodiments.

Figure 5:
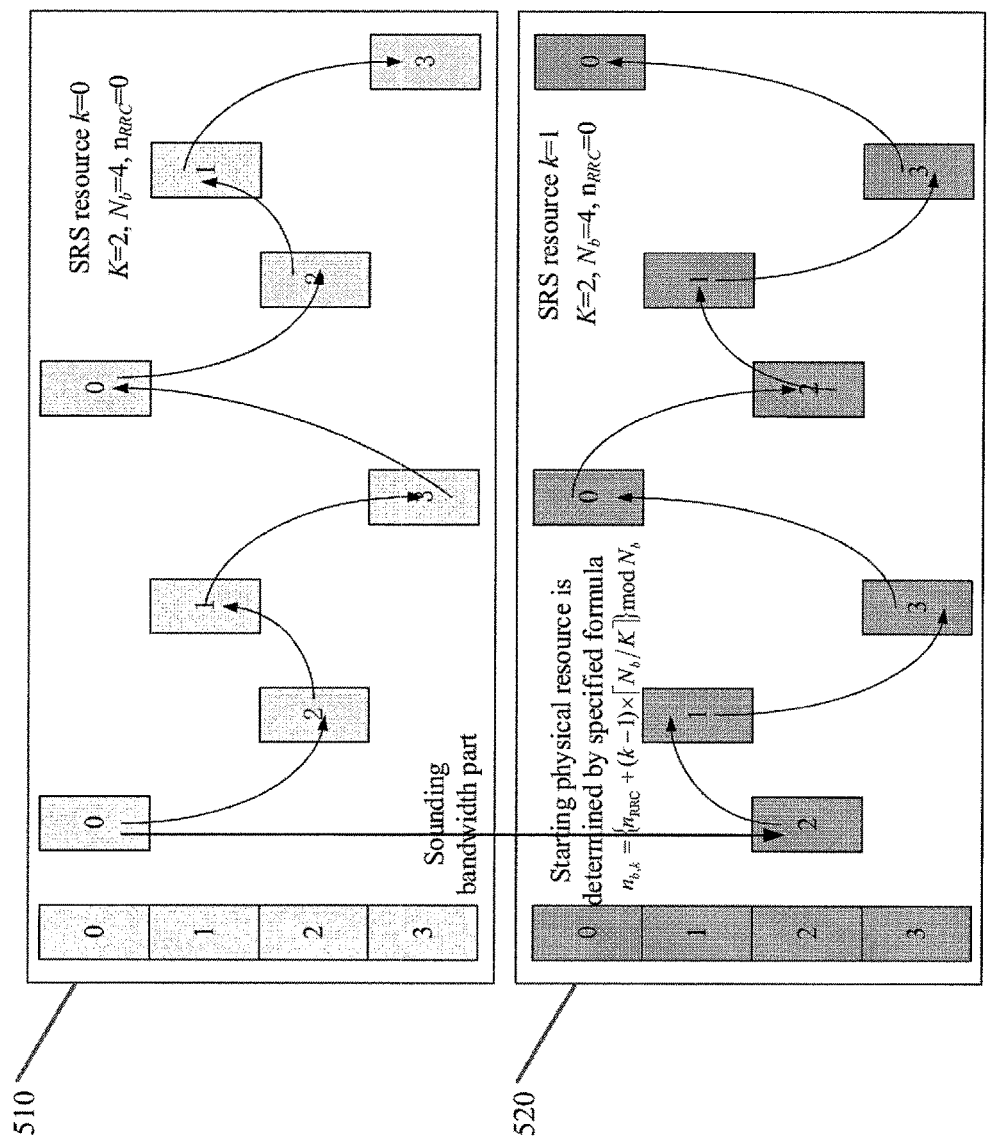
FIG. 5 illustrates an example of sounding reference signal hopping according to certain embodiments.

FIG. 5 illustrates an example of a sounding reference signal hopping scheme according to certain embodiments. To support unified frequency hopping for multiple antenna groups, independent SRS hopping for each SRS resource may be provided. Starting physical blocks for each SRS resource may be carefully designed to meet hopping in both frequency and/or antenna domain. In some embodiments, the transmitting of the SRS by the user equipment using the resource group may include independent frequency hopping with a different starting physical resource block for each of the plurality of resources. This means that $n_{SRS}$ may be independently counted for each SRS resource. $n_{SRS}$ may be a counter for SRS transmission in a time domain. For example, during hopping, SRS may be transmitted in bandwidth 1 when $n_{SRS}$ equals zero. SRS may then be transmitted in bandwidth 2 when $n_{SRS}$ equals one. In some examples, one $n_{SRS}$ may correspond to one OFDM symbol for SRS transmission. Because the frequency hopping at each of the plurality of resources may be independent, the frequency hopping chosen for one resource within the resource group may not impact another resource. In certain embodiments, the hopping scheme may be reused for each SRS resource.

In certain embodiments, to realize the hopping transmission in the frequency domain for different antenna ports in different resources within the resource group, starting physical resource blocks may be different for each of the plurality of resources within the resource group. As discussed above, in one embodiment the starting physical resource block for the first resource in the resource group may be configured by $n_{RRC}$, and the starting physical blocks for the other resources in the group can be determined by the following equation: $n_{b,k} = \{n_{RRC} + (k-1) \times \lceil N_b/K \rceil\} \bmod N_b \cdot n_{b,k}$ represents the starting physical resource block for the k-th SRS resource, $N_b$ describes a sub-band number for hopping, b denotes the hopping level, and K denotes the total SRS resource number in the resource group, while k denotes the position of the SRS resource within the total SRS resource number. The formula may therefore be used to determine the starting physical resource in the frequency domain, such as a physical resource block (PRB) for each SRS resource k within the resource group.

FIG. 5 illustrates an example of hopping in two different resource groups 510 and 520, each including a frequency bandwidth ranging from 0 to 3. As can be seen in FIG. 5, the starting physical resource block of resource group 510 may be 0. Each following block falls in a different position in the bandwidth, and may be associated with a different one of the plurality of resources within the group. In other words, frequency hopping may occur for each of the plurality of resources in the resource group, meaning that the SRS transmission using each of the resources may occur on a different frequency. As shown in resource group 510, the initial physical resource block may utilize a frequency of 0, and proceed to transmit the SRS on physical resource blocks 2, 1, 3, 0, 2, 1, and 3. In resource group 520, on the other hand, the initial physical resource block may utilize a frequency of 2, and may proceed to transmit the SRS on the physical resource blocks 1, 3, 0, 2, 1, 3, and 0.

FIG. 6 illustrates an example of a sounding reference signal antenna port scheme according to certain embodiments. In particular, FIG. 6 is directed to determining antenna port switching and/or repetition for SRS transmission. In certain embodiments, a network entity or a network operator may use bitmap signaling to indicate to the user equipment whether an SRS is transmitted in a given resource within the resource group via antenna port switching or repetition. A first option using bitmap signaling 611 assumes that antenna ports are divided into groups in a predetermined manner, such as for example {0,1} and {2,3}. In option 611, one bitmap may be used to indicate whether antenna port is switched for each SRS resource in a resource group. Specifically, value '1' may denote antenna port switching, while value '0' may denote repetition, meaning that the same antenna port is used with respect to the previous SRS resource. For the first SRS resource, the first antenna port group may be used, and the antenna port group index for other SRS resources may increase when antenna switching is used, and not changed when repetition may be used.

FIG. 6 also illustrates a second option using bitmap signaling 612. In option 612, one bitmap may be used to indicate which antenna port group may be used for each SRS resource in the resource group. The antenna ports used for SRS transmission in each of the plurality of resources may be defined in an antenna port group. A value of '0' may denote using a first antenna group, with antenna ports {0,1}, while a value of '1' may denote using a second antenna group, with antenna ports {2,3}. For each of the plurality of resources in the resource group, the indication bit number may be determined by a logarithm of a total antenna port group, which may be obtained by dividing the total number of antenna ports by the antenna port number in one of the plurality of resources.

Certain embodiments may utilize an implicit principle 620, as shown in FIG. 6, to determine which antenna port may be used for SRS transmission. Using implicit principle 620, the plurality of resources may first transmit the SRS via repetition and then via antenna port switching. The number of repetitions may be determined based on predefined configuration parameters, and the antenna port switching may be determined based on the implicit principle. For example, one user equipment may be configured with 2 repetitions and 4 resources for a resource group. The implicit principle, for example, may be first performing repetition and then antenna switching. The user equipment may then transmit the SRS using the first two resources in the resource group via repetition in a first antenna port group, which includes antenna ports {0, 1}. The user equipment may then transmit the SRS using the last two resources in the resource group via repetition using a second antenna port group, which includes antenna ports {2, 3}.

In some other embodiments, a simplified signaling embodiment 630 may be used. In simplified signaling embodiment 630, only 1 bit may be used to indicate an antenna port, even when the antenna port uses multiple SRS resources. For example, value '0' may denote a first level as repetition, while also denoting a second level as antenna or beam switching. Value '1' may denote a first level as antenna or beam switching, while also denoting a second level as repetition. The repetition number and the number of resources in the resource group may be configured by higher layer signaling from a core network entity, network operator, or the gNB.

In one embodiment, when signaling a value of '0', the SRS may be transmitted on resources 1, 2 in the resource group using antenna ports 0, 1 via repetition. The SRS may also be transmitted on resources 3, 4, with antenna ports 2, 3 via repetition. When signaling a value of '1', the SRS may be transmitted on resource 1, 3 with antenna port 0, 1 via repetition, while resource 2, 4 transmit SRS using antenna ports 2, 3 via repetition. In some embodiments, when the repetition number equals the resource number, all the resources may be used for repetition transmission. When the repetition number value equals '1', all the SRS resources may be used for antenna switching. Similar to the configuration parameters in 620, the configuration parameters in 630 may indicate that the number of the plurality of resources is four, and the repetition number for SRS transmission is two.

In certain embodiments, a triggering mechanism may be used for SRS transmission with antenna switching and/or repetition. When the network entity, such as a gNB, wants to know of the downlink CSI by reciprocity, the network entity may send a message to the user equipment that may trigger aperiodic SRS transmission. When SRS transmission may be performed via antenna switching and/or repetition, the aperiodic SRS transmission may be triggered based on the resource group. SRS transmissions via the antenna ports switching and/or repetition may be triggered by a single transmission from the gNB. In some embodiments, when multiple resource groups are configured for multiple transmission beams/beam pairs, gNB may choose to trigger one or more resource groups for SRS transmission in order to obtain a full, proper CSI for one or more beams.

FIG. 7A illustrates an example of a sounding reference signal value table according to certain embodiments. In particular, table 710 shown in FIG. 7A illustrates an SRS request value for aperiodic triggering including a 2-bit transmission. An SRS parameter set, which may be associated with an SRS request field value, may include the configuration parameters for multiple SRS resource groups associated with multiple candidate beams or beam pairs. In some embodiments, the configuration parameters for the plurality of resources in the resource group may be different, such as different time offsets or starting physical resources for hopping, as shown in FIG. 5.

For example, Value '00' may indicate no type 1 SRS trigger. Value '01' in Table 710 may include the first resource group depicted in FIG. 3, where the resource group may be associated with a first beam or a first pair of beams. Value '10' in Table 720, meanwhile, may include the second resource group depicted in FIG. 3, where the resource group may be associated with a second beam or a second beam pair. On the other hand, value '11' in Table 720 may include the first and second resource groups as depicted in FIG. 3, where the resource groups are associated with first and second beams or a first and a second beam pair. In some embodiments, for each resource in the triggered set, the resource may have different configuration parameters, such as time offset and/or starting physical resources for hopping.

FIG. 7B illustrates an example of a sounding reference signal value table according to certain embodiments. In particular, table 720 shown in FIG. 7B illustrates an SRS request value for aperiodic triggering including a 1-bit transmission. Value '00' may indicate no type 1 SRS trigger, while value '01' may indicate that the first SRS parameter set for resource group set 1 may be configured via higher layer signaling.

FIG. 8 illustrates a flow diagram according to certain embodiments. In particular, FIG. 8 illustrates an embodiment of a method performed by a user equipment. In step 810, the user equipment may receive a signaling indication including configuration parameters for SRS transmission at the user equipment from the network entity. The signaling indication may, in certain embodiments, indicate a configuration for SRS transmission via at least one of antenna switching or repetition using a resource group. A signaling indication may also include other configurations, such as a limited time interval between at least two of the plurality of resources within the resource group, for example a time offset between SRS resource in a resource group, or a starting physical resource block for each SRS resource.

Embodiments of the signaling indication may be seen at least in FIGS. 6, 7A, and 7B. The resource group may include a plurality of resources that are either adjacent or have a limited time interval between at least two of the plurality of resources within the resource group, as shown in FIG. 4.

In step 820, the user equipment may transmit the SRS to the network entity via at least one of the antenna switching or the repetition using the resource group, as shown at least in FIG. 3. The resource group may be associated with at least one beam. In embodiments in which SRS hopping may be used, the transmitting of the SRS may use independent frequency hopping with a different starting physical resource block for each of the plurality of resources within the resource group, as shown in FIG. 5. Hopping may be used for either periodic or aperiodic SRS. In addition, the resource group may be associated with a downlink channel quality information acquisition for at least one beam.

In step 830, the user equipment may receive a message triggering a transmission of an aperiodic sounding reference signal based on the resource group from the network entity. The messages may include a value of the SRS request field, as shown in FIGS. 7A and 7B. In response, the user equipment may transmit the aperiodic SRS in response to the message via the at least one antenna switching or the repetition using the plurality of resources from the resource group, as shown in step 840. The limited time interval between the at least two of the plurality of resources within the resource group may comprise one or more orthogonal frequency division multiplexing symbols.

The resource group may include common characteristics. The common characteristics may include at least one of a sounding reference signal bandwidth, frequency hopping bandwidth, number of antenna ports, or a period to simplify configuration signaling of the sounding reference signal. In certain embodiments, the signaling indication may include an indication scheme that comprises a first value indicating a repetition and a second value indicating an antenna switching as shown in FIG. 6. Alternatively, the signaling indication may include an indication of antenna port group. In some other embodiments, the signaling indication may include an indication scheme that comprises a first value indicating first the repetition and second the antenna switching, and a second value indicating first the antenna switching and second the repetition. In another embodiment, the signaling indication may include an implicit principle indicating first the repetition and second the antenna switching, as shown in FIG. 6.

Figure 9:
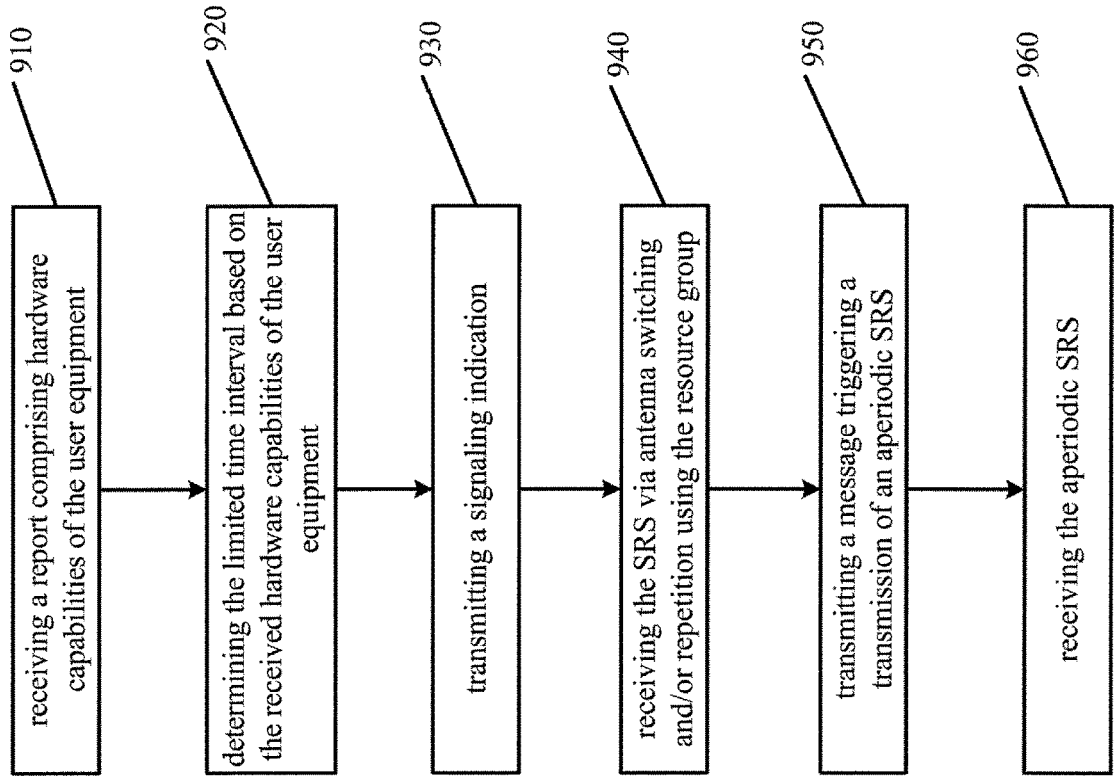
FIG. 9 illustrates an example of a flow diagram according to certain embodiments.

FIG. 9 illustrates a flow diagram according to certain embodiments. In particular, FIG. 9 illustrates an embodiment of a method according to a network entity. In step 910, the network entity may receiving a report comprising hardware capabilities of the user equipment. The capabilities, for example, may be the minimum antenna switching timing of the user equipment. In step 920, the network entity may determine the limited time interval between at least two of the plurality of resources within the resource group based on the received hardware capabilities of the user equipment, as shown in FIG. 4.

In step 930, the network may transmit a signaling indication to a user equipment. The signaling indication may indicate a configuration for SRS transmission via at least one of antenna switching or repetition using a resource group. The signaling indication may include a limited time interval between at least two of the plurality of resources within the resource group, for example a time offset between SRS resource in one resource group. The signaling indication may also include other configuration, such as starting physical resource block for each SRS resource. Embodiments of the signaling indications may be seen at least in FIGS. 6, 7A, and 7B. The resource group may include a plurality of resources that are either adjacent or have a limited time interval between at least two of the plurality of resources within the resource group, as shown in FIG. 4.

In step 940, the network entity may receive the SRS from the user equipment via at least one of the antenna switching or the repetition using the resource group. In certain embodiments, the SRS may be received on each of the plurality of resources on independent frequencies due to transmittal of the sounding reference signal using independent frequency hopping. In embodiments in which SRS hopping may be used, the transmitting of the SRS may use independent frequency hopping with a different starting physical resource block for each of the plurality of resources within the resource group, as shown in FIG. 5.

In step 950, the network entity may transmit to the user equipment a message. The message may trigger a transmission of an aperiodic SRS based on the resource group. The messages may include a value of the SRS request field, as shown in FIGS. 7A and 7B. In step 960, the network entity may then receive the aperiodic SRS in response to the message via the at least one antenna switching or the repetition using the resource group.

Figure 10:
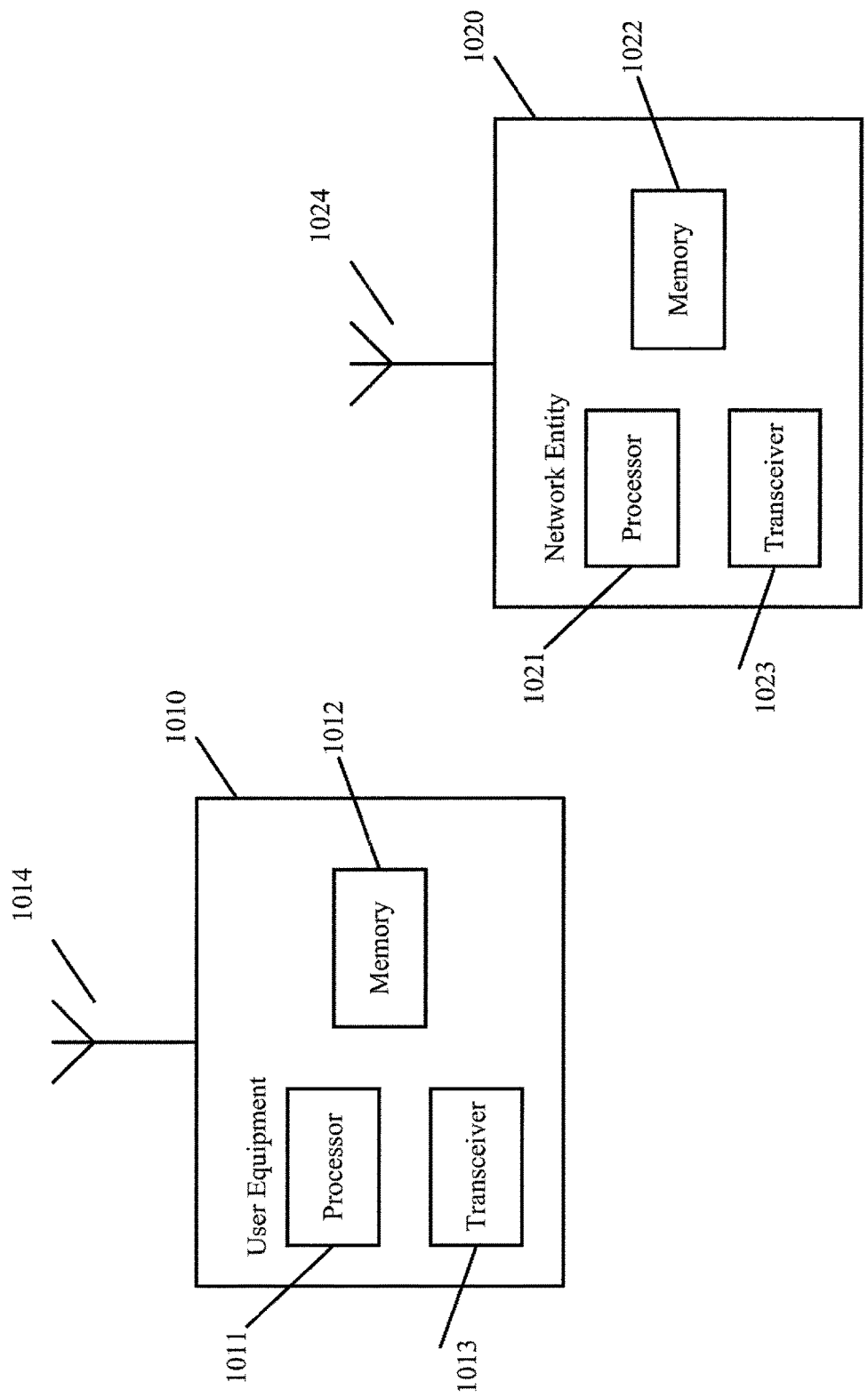
FIG. 10 illustrates an example of a system according to certain embodiments.

FIG. 10 illustrates a system according to certain embodiments. It should be understood that each signal or block in FIGS. 1-9 may be implemented by various means or their combinations, such as hardware, software, firmware, one or more processors and/or circuitry. In one embodiment, a system may include several devices, such as, for example, a network entity 1020 or a user equipment (UE) 1010. The system may include more than one UE 1010 and more one network entity 1020, although only one access node shown for the purposes of illustration. The network entity may be a network node, an access node, a base station, a 5G/NR NodeB (gNB), server, host, or any of the other access or network node discussed herein.

Each of these devices may include at least one processor or control unit or module, respectively indicated as 1011 and 1021. At least one memory may be provided in each device, and indicated as 1012 and 1022, respectively. The memory may include computer program instructions or computer code contained therein. One or more transceiver 1013 and 1023 may be provided, and each device may also include an antenna, respectively illustrated as 1014 and 1024. Although only one antenna each is shown, many antennas and multiple antenna elements may be provided to each of the devices. Higher category UEs generally include multiple antenna panels. Other configurations of these devices, for example, may be provided. For example, network entity 1020 and UE 1010 may be additionally configured for wired communication, in addition to wireless communication, and in such a case antennas 1014 and 1024 may illustrate any form of communication hardware, without being limited to merely an antenna.

Transceivers 1013 and 1023 may each, independently, be a transmitter, a receiver, or both a transmitter and a receiver, or a unit or device that may be configured both for transmission and reception. In other embodiments, the UAVs or the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server. A beamformer may be a type of transceiver.

A user device or user equipment 1010 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The UE may also be a machine type communication (MTC) device, which may not require human interaction, such as a sensor or a meter.

In some embodiments, an apparatus, such as a network entity, may include means for carrying out embodiments described above in relation to FIGS. 1-9. In certain embodiments, at least one memory including computer program code can be configured to, with the at least one processor, cause the apparatus at least to perform any of the processes described herein.

Processors 1011 and 1021 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 1012 and 1022 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 1020 or UE 1010, to perform any of the processes described above (see, for example, FIGS. 1-9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 10 illustrates a system including a network entity 1020 and UE 1010, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 1010 may likewise be provided with a variety of configurations for communication other than communication network entity 1020. For example, the UE 1010 may be configured for device-to-device or machine-to-machine transmission.

The above embodiments may provide for significant improvements to the functioning of a network and/or to the functioning of the network entities within the network. Specifically, certain embodiments may support SRS transmission via antenna switching and/or repetition for user equipment with diverse Tx/Rx antenna configuration. The above embodiments may also provide for an efficient tradeoff between channel estimation performance requirements and antenna switching time requirements of the hardware. Some embodiments may further support flexible frequency hopping, while also providing an effective and flexible triggering mechanism, in case of antenna switching or repetition.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary
3GPP Third Generation Partnership Project
5G Fifth Generation
NR New Radio
LTE Long Term Evolution
gNB NR Node B
CSI Channel State Information
SRS Sounding Reference Signal
SU MIMO Single User Multiple Input Multiple Output
Tx Transmitter
Rx Receiver
UE User Equipment

What is claimed is:

1. An apparatus, comprising:
at least one processor; and
at least one memory including computer program code,
wherein the at least one memory and the computer program code are configured to, with the at least one processor, cause the apparatus at least to:
receive a signaling indication at a user equipment from a network entity, wherein the signaling indication indicates a configuration for sounding reference signal transmission via at least one of antenna switching or repetition using a resource group, wherein the resource group comprises a plurality of resources that are either adjacent or have a limited time interval between at least two of the plurality of resources within the resource group; and
transmit the sounding reference signal from the user equipment to the network entity via at least one of the antenna switching or the repetition using the resource group.

2. The apparatus according to claim 1, wherein the resource group is associated with at least one beam, wherein the at least one beam includes a transmitter or receiver spatial filter assumption.

3. The apparatus according to claim 1, wherein the at least one memory and the computer program code are configured to, with the at least one processor, cause the apparatus further to:
receive, at the user equipment, a message from the network entity triggering a transmission of an aperiodic sounding reference signal using the resource group; and
transmit the aperiodic sounding reference signal in response to the message via the at least one antenna switching or the repetition using the plurality of resources from the resource group.

4. The apparatus according to claim 1, wherein the limited time interval between the at least two of the plurality of resources within the resource group comprises one or more orthogonal frequency division multiplexing symbols.

5. The apparatus according to claim 1, wherein when transmitting the sounding reference signal using the plurality of resources, the at least one memory and the computer program code are configured to, with the at least one processor, cause the apparatus to perform independent frequency hopping with a different starting physical resource block for each of the plurality of resources within the resource group.

6. The apparatus according to claim 1, wherein the resources of the resource group comprise common characteristics, wherein the common characteristics includes at least one of a sounding reference signal bandwidth, frequency hopping bandwidth, number of antenna ports, or a period of the configuration signaling of the sounding reference signal.

7. The apparatus according to claim 1, wherein the signaling indication comprises a bitmap signaling to indicate whether antenna switching or repetition is made for each of the plurality of resources within the resource group used for the transmitting of the sounding reference signal, an indication scheme comprising a first value indicating first the repetition and second the antenna switching, and a second value indicating first the antenna switching and second the repetition, or an implicit principle indicating first the repetition and second the antenna switching.

8. The apparatus according to claim 1, wherein the limited time interval between the plurality of resources is a time offset determined by hardware capabilities of the user equipment.

9. An apparatus, comprising:
at least one processor; and
at least one memory including computer program code,
wherein the at least one memory and the computer program code are configured to, with the at least one processor, cause the apparatus at least to:
transmit a signaling indication from a network entity to a user equipment, wherein the signaling indication indicates a configuration for transmitting a sounding reference signal via at least one of antenna switching or repetition using a resource group, wherein the resource group comprises a plurality of resources that are either adjacent or have a limited time interval between at least two of the plurality of resources within the resource group; and
receive the sounding reference signal from the user equipment at the network entity via at least one of the antenna switching or the repetition using the resource group.

10. The apparatus according to claim 9, wherein the at least one memory and the computer program code are configured to, with the at least one processor, cause the apparatus further to:
receive a report comprising hardware capabilities of the user equipment; and
determine the limited time interval between at least two of the plurality of resources within the resource group based on the received hardware capabilities of the user equipment.

11. The apparatus according to claim 9, wherein the resource group is associated with at least one beam, wherein the at least one beam includes a transmitter or receiver spatial filter assumption.

12. The apparatus according to claim 9, wherein the at least one memory and the computer program code are configured to, with the at least one processor, cause the apparatus further to:
transmit a message to the user equipment from the network entity, wherein the message triggers a transmission of an aperiodic sounding reference signal using the resource group; and
receive the aperiodic sounding reference signal in response to the message via the at least one antenna switching or the repetition using the resource group.

13. The apparatus according to claim 9, wherein the sounding reference signal received on each of the plurality of resources is received on independent frequencies due to transmittal of the sounding reference signal using independent frequency hopping.

14. The apparatus according to claim 9, wherein the resources of the resource group comprise a common characteristic, wherein the common characteristic comprises at least one of a sounding reference signal bandwidth, frequency hopping bandwidth, number of antenna ports, or a period of the configuration signaling of the sounding reference signal.

15. A method, comprising:
receiving a signaling indication at a user equipment from a network entity, wherein the signaling indication indicates a configuration for sounding reference signal transmission via at least one of antenna switching or repetition using a resource group, wherein the resource group comprises a plurality of resources that are either adjacent or have a limited time interval between at least two of the plurality of resources within the resource group; and transmitting the sounding reference signal from the user equipment to the network entity via at least one of the antenna switching or the repetition using the resource group.

16. The method according to claim 15, wherein the resource group is associated with at least one beam, wherein the at least one beam comprises a transmitter or receiver spatial filter assumption.

17. The method according to claim 15, further comprising:

receiving at the user equipment a message from the network entity triggering a transmission of an aperiodic sounding reference signal using the resource group; and transmitting the aperiodic sounding reference signal in response to the message via the at least one antenna switching or the repetition using the plurality of resources from the resource group.

18. The method according to claim 15, wherein the limited time interval between the at least two of the plurality of resources within the resource group comprises one or more orthogonal frequency division multiplexing symbols.

19. The method according to claim 15, wherein the transmitting of the sounding reference signal using the plurality of resources comprises independent frequency hopping with a different starting physical resource block for each of the plurality of resources within the resource group.

20. The method according to claim 15, wherein the resources of the resource group comprise common characteristics, wherein the common characteristics includes at least one of a sounding reference signal bandwidth, frequency hopping bandwidth, number of antenna ports, or a period of the configuration signaling of the sounding reference signal.

* * * * *